3,517,020
CERTAIN 1-(3'-NICOTINOYL)-2-LOWERALKYL-
THIO-BENZIMIDAZOLES
Marcel K. Eberle, Madison, N.J., assignor to Sandoz-
Wander, Inc., a corporation of Delaware
No Drawing. Filed Nov. 1, 1967, Ser. No. 679,609
Int. Cl. C07d 31/50
U.S. Cl. 260—294.8          2 Claims

ABSTRACT OF THE DISCLOSURE

This disclosure pertains to certain 2-loweralkylthio-benzimidazoles, e.g., 2-methylthio - 1 - (3'-nicotinoyl)-benzimidazole. These compounds are useful as anti-inflammatory agents.

---

This invention relates to novel heterocyclic compounds. In particular, this invention pertains to 1-substituted - 2 - loweralkylthio benzimidazoles and to methods for preparing them.

The benzimidazoles of the present invention may be represented by the following structural formula:

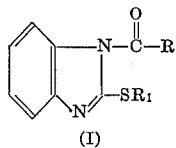

(I)

where:

R represents pyridyl; and
$R_1$ represents loweralkyl.

As representative of the loweralkyl groups represented by $R_1$, there may be mentioned methyl, ethyl, isopropyl and the like.

The compounds of Formula I above may be prepared by treating a pyridine carbonyl halide with a 2-lower alkylthio benzimidazole. The process for preparing the benzimidazoles (I) may be represented by the following reaction:

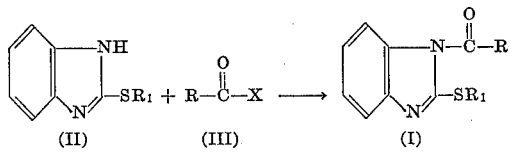

where R and $R_1$ are as defined above, and X is chloro or bromo.

In accordance with the above process, the benzimidazoles of Formula I are prepared by treating the carbonyl halide of Formula III with a loweralkylthio benzimidazole of Formula II in a solvent such as ether, water, dimethylformamide, lower alkanols such as methanol, ethanol, and the like, chlorinated hydrocarbons, e.g., methylene chloride and carbon tetrachloride, or mixtures thereof. The reaction is conducted at temperatures of about −20° C. to 80° C. and is preferably conducted starting at about 0° C. to about room temperature for about ½ to 24 hours. Neither the presence of solvent, the particular solvent used, nor the temperature of reaction is critical in obtaining the benzimidazoles of this invention. The resulting products (I) are recovered utilizing conventional recovery techniques such as recrystallization, filtration and the like. It is preferred in the above process to take up available hydrogen halide by use of an organic base, and pyridine may be used for this purpose.

Various of the carbonyl halides (III) and benzimidazoles of Formula II are known and may be prepared according to methods disclosed in the literature. Those compounds of Formulas II and III not specifically disclosed in the literature may be prepared from available materials in an analogous manner.

The benzimidazoles of Formula I are useful because they possess pharmaceutical properties in animals. In particular, these compounds are useful as anti-inflammatory agents, as indicated by the carrageenin-induced edema test on the white rat paw. When so utilized the compounds may be combined with one or more pharmaceutically acceptable carriers or adjuvants. They may be administered orally or parenterally, and depending upon the compound employed and the mode of administration, the exact dosage utilized may vary. In general, satisfactory results are obtained when these compounds are administered at a daily dosage of about 10 milligrams to about 250 milligrams per kilogram of animal body weight. This daily dosage is preferably administered 2 to 4 times a day, or in sustained release form. For most large mammals, the total daily dosage is from about 1000 milligrams to about 3000 milligrams. Dosage forms suitable for internal use comprise from about 250 milligrams to about 1500 milligrams of the active compound in intimate admixture with a solid or liquid pharmaceutically acceptable carrier or diluent.

A representative formulation suitable for oral administration is a tablet prepared by standard tabletting techniques which contains the following:

| Ingredient: | Parts by weight |
|---|---|
| 2 - methylthio - 1 - (3' - nicotinoyl)-benzimidazole | 70 |
| Tragacanth | 2 |
| Lactose | 19.5 |
| Corn starch | 5 |
| Talcum | 3 |
| Magnesium stearate | 0.5 |

The following example is provided for the purpose of illustration and not by way of limitation. It is not intended so as to limit the scope of the invention as defined in the appended claims.

EXAMPLE 2-methylthio-1(3'-nicotinoyl)-benzimidazole

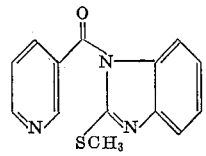

17.8 g. of nicotinic acid chloride hydrochloride, prepared from reaction of nicotinic acid and thionyl chloride in the presence of catalytic amounts of dimethylformamide at about room temperature, is added in small portions to a mixture of 200 ml. of methylene chloride, 16.4 g. of 2-methylthiobenzimidazole and 20 ml. of pyridine which are cooled in an ice bath. Methylene chloride (200 ml.) is then added and the mixture is stirred at room temperature for 14 hours. It is then poured onto saturated sodium carbonate solution (100 ml.), extracted with 300 ml. of ether, dried over sodium sulfate and evaporated to provide a crude product. This crude crystalline material is then twice filtered through a silica column with chloroform and recrystallized from ethanol to provide 6.5 g. of substantially pure 2-methylthio-1(3'-nicotinoyl)-benzimidazole; M.P. 129° C.

When the above process is carried out and nicotinic acid bromide hydrobromide is used in place of the chloride hydrochloride, 2-methylthio-1(3'-nicotinoyl)-benzimidazole again results.

What is claimed is:
1. A compound of the formula
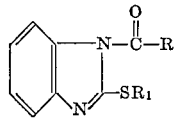
where:
R represents pyridyl; and
$R_1$ represents lower alkyl.
2. The compound of claim 1 which is 2-methylthio-1(3'-nicotinoyl)-benzimidazole.
References Cited
UNITED STATES PATENTS
3,320,280   5/1967   Gal et al.   260—326.12
HENRY R. JILES, Primary Examiner
A. L. ROTMAN, Assistant Examiner
U.S. Cl. X.R.
260—309.2; 424—266